US007596963B2

(12) United States Patent
Rasmussen

(10) Patent No.: US 7,596,963 B2
(45) Date of Patent: Oct. 6, 2009

(54) CONVEYOR SCREW FOR USE AS SURFACE SCRAPER IN COOLING AND FREEZING UNITS

(75) Inventor: Henrik Guldmann Rasmussen, Tranbjerg (DK)

(73) Assignee: Tetra Laval Holding & Finance S.A., Pully (CH)

( * ) Notice: Subject to any disclaimer, the term of this patent is extended or adjusted under 35 U.S.C. 154(b) by 213 days.

(21) Appl. No.: 10/541,792

(22) PCT Filed: Jan. 8, 2004

(86) PCT No.: PCT/DK2004/000009

§ 371 (c)(1),
(2), (4) Date: Mar. 8, 2006

(87) PCT Pub. No.: WO2004/062883

PCT Pub. Date: Jul. 29, 2004

(65) Prior Publication Data

US 2006/0145377 A1 Jul. 6, 2006

(30) Foreign Application Priority Data

Jan. 10, 2003 (DK) ............................... 2003 00022

(51) Int. Cl.
*A23B 9/12* (2006.01)
(52) U.S. Cl. .......................... 62/343; 366/323
(58) Field of Classification Search ........... 62/342–343; 366/329.1, 322–323
See application file for complete search history.

(56) References Cited

U.S. PATENT DOCUMENTS 3,145,017 A * 8/1964 Thomas ...................... 366/310

| 3,293,117 A * | 12/1966 | Rich et. al. .................. 162/236 |
| 3,518,721 A | 7/1970 | Rukas et al. |
| 3,701,512 A | 10/1972 | Schippers et al. |
| 3,989,941 A | 11/1976 | Gasior et al. |
| 4,045,401 A | 8/1977 | Stenmark et al. |
| 4,610,068 A * | 9/1986 | Schultz ......................... 29/418 |
| 4,739,907 A * | 4/1988 | Gallant ....................... 222/240 |
| 5,141,326 A | 8/1992 | Eshima |
| 5,345,781 A | 9/1994 | Fels et al. |
| 5,876,117 A * | 3/1999 | Chen ........................... 366/320 |
| 6,082,120 A * | 7/2000 | Hoffmann et al. .............. 62/68 |
| 6,132,075 A * | 10/2000 | Medici et al. ................. 366/79 |
| 6,585,406 B2 * | 7/2003 | Toepper et al. .............. 366/320 |

FOREIGN PATENT DOCUMENTS

| DE | 1 018 438 | 10/1957 |
| DE | 39 18 268 C1 | 7/1990 |
| GB | 2 262 905 A | 7/1993 |
| JP | 56-92039 | 7/1981 |
| WO | WO 97/26800 A1 | 7/1997 |
| WO | WO 00/44548 A1 | 8/2000 |
| WO | WO 00/72697 A1 | 12/2000 |

* cited by examiner

*Primary Examiner*—William E Tapolcai
(74) *Attorney, Agent, or Firm*—David S. Safran; Roberts Mlotkowski Safran & Cole, P.C.

(57) ABSTRACT

A conveyor screw for conveyance of high viscose masses and an apparatus with such a conveyor screw, preferably for production of an ice cream. Said crew having a plurality of screw flights, where at least two screw flights extend from an inlet end part of the conveyor screw and wherein the outer edges of the two screw flights extend in different radial distance from longitudinal axis. Whereby the radially shorter screw flight assists with the conveyance of a part of the mass without affecting the whole mass and especially without affecting the ice layer, which by use of the conveyor screw in a through-flow freezer is created on the inner wall of the freezing cylinder. Cooling the mass to a temperature of –15° C. or lower as preparation for extrusion of the mass for formation.

23 Claims, 4 Drawing Sheets

CONVEYOR SCREW FOR USE AS SURFACE SCRAPER IN COOLING AND FREEZING UNITS

The present relates to a conveyor screw for conveyance of high viscose masses and an apparatus with such a conveyor screw, preferably for production of an ice cream mass and more specific, a production where the material in shape of the so-called mix with a substantial content of air firstly is cooled down to an ordinary forming temperature of typical −5° C. and is then led further through a through-flow freezer with a scraping conveyor screw, wherein it is aimed to cool the mass to a temperature of −15° C. or lower as preparation for extrusion of the mass for forming of the final ice cream bodies for packing and final storage.

BACKGROUND OF THE INVENTION

By use of a through-flow freeze for this purpose, an ice layer is formed on the inner wall of the freezing cylinder of the through-flow freezer, which has to be scraped off by means of the conveyor screw that is rotating in the freezing cylinder and at the same time creates a positive conveyance of the ice cream mass through the freezing cylinder. The result of the use of such a known conveyor screw freezer for the further cooling down is, however, not positive as, in order to carry out the scraping off and the conveyance of the ice cream mass, it is necessary to add such a quantity of power that the freezer will become inefficient due to the added scraping, kneading and pumping power, which results in a generation of heat in the ice cream mass. This generation of heat is counteracted by using further low temperatures for freezing ice on the inner wall of the cylinder with the result that the formation of the ice layer is increased so that again more power is required in order to perform the scraping function.

Through-flow freezers, which work in this way, are known from the literature, see DE-A-39 18 268 and WO 97/26800, but are rarely used in practice as far as ordinary ice cream is concerned as it has been found that the process involves quite essential problems. In a principal level, the process type is most attractive as it ideally would make it possible to form and pack ice bodies directly for the final storage without the conventional use of a temporary and expensive freezing system between the packing station and the final storage. Moreover, an intensive cooling of the mass will enable an improved product quality, in particular when producing larger block products.

The starting point of the invention is a conventional through-flow freezer having a driven, scraping conveyor screw dimensioned for further conveyance of the flow from the preceding conventional through-flow freezer which cools the mass down to approximately −5° C. A standard mix of ice cream with a so-called overrun (degree of swelling) of 100% was used, i.e. the volume of the air added the liquid mix in percentage of the volume of the liquid mix, and in the subsequent through-flow freezer, which should cool the ice cream from the first through-flow freezer further down to approx. −15° C., an evaporation temperature of approximately −40° C. was used.

The higher viscosity of the ice cream in the subsequent through-flow freezer due to the lower temperature caused a number of problems. The mechanical power, which must be used in order to drive the conveyor screw around, becomes substantially higher than for the preceding through-flow freezer where the temperature of the ice cream mass is higher and the motor driving the conveyor screw therefore has to yield a larger torque. The mechanical power is deposed in the ice cream mass which therefore must be cooled further and cause a higher power consumption for cooling, as well as a limitation of the capacity of the subsequent through-flow freezer. In addition, the inlet pressure of the subsequent through-flow freezer must be high, in the order of 12-14 bar, in order for the ice cream mass to be fed to it, which poses heavy demands on pipes, gaskets etc. strains the preceding through-flow freezer, which must deliver the high pressure as well as reduces the quality of the product as the high pressure causes a lowering of the melting point of the ice cream mass which promotes the development of ice crystals in the ice cream mass and reduces the overrun of the ice cream. Further, experiments showed that the discharge quantity per time unit for the subsequent through-flow freezer displayed fluctuations, which is inexpedient for the further manufacturing process for the ice cream mass, and that the degree of swelling decreased form inlet to outlet during creation of larger air pockets in the ice cream mass.

It is therefore an object of the present invention to provide a conveyor screw and a conveyor with such a conveyor screw, which can convey high viscose masses such as ice cream mass by use of a lower conveyance power.

It is a further object of the invention to provide such a conveyor screw where the inlet suction at the inlet end is increased so that the in-feed pressure may be reduced.

Furthermore, it is an object of the present invention to provide an apparatus for making ice cream comprising a through-flow freezer with a conveyor screw which can convey high viscose ice cream mass by use of a reduced conveyance power compared to known apparatuses with conveyor screws.

It is yet another object of the invention to provide such an apparatus where the inlet suction at the inlet end of the conveyor screw is increased so that the feed-in pressure may be reduced compared to known apparatuses.

In general, it is an object of the invention to improve the efficiency of such a conveyor screw and such an apparatus and facilitate or eliminate one or more of the disadvantages described above.

By the invention a conveyor screw having a plurality of screw flights is provided where at least two screw flights extend from an inlet end part of the conveyor screw, wherein the outer edges of the two screw flights extend in different radial distance from the longitudinal axis. Thereby, the radially shorter screw flight assists with the conveyance of a part of the mass without affecting the whole mass and especially without affecting the ice layer, which by use of the conveyor screw in a through-flow freezer is created on the inner wall of the freezing cylinder. It has shown that by conveyance of a high viscose mass, a lower conveyance power is used by this type of conveyor screw than by any other known type. The effect is especially shown by use in a through-flow freezer which further cools down an already frozen ice cream mass, but is also shown by conveyance of other high viscose masses where the resistance against conveyance of the mass is highest at the cylinder wall where the mass attaches. The inlet pressure by the through-flow freezer, which was used for the experiment, could be reduced to 4-6 bar compared with 12-14 bar earlier.

Conveyor screws with several screw flights of which some have a shorter radial extent are known from extruder machines as described in U.S. Pat. No. 3,701,512, GB 2 262 905, U.S. Pat. Nos. 6,132,075 and 5,141,326 where these screw flights are arranged in a compressing or outlet zone with quite another effect than the one achieved with the present invention.

Fulfilment of the other objects of the invention and other advantages thereby will appear from the following description.

GENERAL DESCRIPTION OF THE INVENTION

The present invention relates to a conveyor screw having a plurality of screw flights each extending in a helical path about a longitudinal axis, at least two screw flights extend from an inlet end part of the conveyor screw, wherein the outer edges of the two screw flights extend in different radial distance from the longitudinal axis. Preferably, said two screw flights extend from substantially the same longitudinal position of the conveyor screw. It is preferred that the one or more screw flights extending at a lower radial distance from the longitudinal axis of the conveyor screw extend from the inlet end part and along the conveyor screw for between 5% and 65%, preferably between 7% and 50% of the total length thereof.

The screw flights are typically fastened to an inner closed core which may be of cylindrical shape but also of another shape, e.g. frusto-conical, in order to vary the open cross-sectional area and thereby the speed of conveyance. The outer edge of the screw flights will for the longest screw flights normally extend to a radius which is constant along the longitudinal axis of the conveyor screw so that the conveyor screw fits into a cylindrical cavity, but also this radius may be varied along the longitudinal axis so that the conveyor screw e.g. fits into a frusto-conical cavity for in this way to vary the open cross-sectional area as well as the surface area of the surface of the cavity with which the conveyed mass comes in contact during the conveyance. The latter can be an advantage if e.g. the heat transfer through the surface is to be increased near the outlet end of the conveyor screw.

In order to lower the necessary inlet pressure for a conveyance apparatus with the said conveyor screw, it is an advantage that said at least two screw flights extend over an inlet end part of the conveyor screw so that the radially shorter screw flights, e.g. 0,85-0,98 times the radius of the longer screw flight, increases the conveyance near the inlet end and thereby increases the inlet suction of the conveyance apparatus.

It is particularly advantageous that at least three screw flights extend over the inlet end part of the conveyor screw where one of the at least three screw flights extend in a higher radial distance from the longitudinal axis than the at least two other screw flights.

The at least two screw flights extending at a lower radial distance from the longitudinal axis, extend in a preferred embodiment from the inlet end part and in different longitudinal distances form the inlet end part so that the assisting conveyance, which is performed by these radially shorter screw flights, decreases gradually from the inlet end and that the mixing of the mass some distance inside the conveyance apparatus thereby is increased with an increased homogeneity of the mass as a result. The radially shorter screw flights perform preferably the conveyance of the warmer ice cream mass with a lower viscosity and as the temperature drops from the inlet end towards the outlet end the quantity of the ice cream mass with the lower viscosity is reduced and thereby the quantity which is to be conveyed by the radially shorter screw flights. The difference in the extension of the screw flights from the inlet end part amounts in a preferred embodiment of the invention to from 8% to 50%, preferably from 12% to 40% of the total length of the conveyor screw by which is understood the part of the conveyor screw which is in contact with the mass being conveyed.

It has appeared to be advantageous that the pitch of the screw flights at the inlet end of the conveyor screw is relatively high, i.e. 0.9 to 1.4, preferably 1.1 to 1.3 unlike the normal pitch of the screw flights of such conveyor screws of 0.5 to 1, where the pitch is given as the ratio of the length of one turn in the longitudinal direction of the conveyor screw and the outer diameter of the longest screw flights. With a high screw pitch, a higher conveyance length per rotation of the conveyor screw is achieved and the scraping frequency is reduced per unit length the mass is conveyed. The speed of rotation can thereby also be lower in order to conveyance a given volume of the mass.

For conveyor screws used in connection with through-flow freezers, it is common to use a rotation in the range of 100-1000 rotations per minute, least for larger cylinders and highest for cylinders with a small diameter. For a representative conveyor screw with an inner screw diameter of 105 mm, the speed will normally be between 200-600 rotations per minute which with a typical screw pitch of between a whole and half time the outer diameter of the screw will result in an axial scraping speed of 1-3.5 m/s.

With the invention it is found to be possible and optimal to operate with a rotational number of as low as 10-50 rotations per minute, preferably with 20-35 rotations per minute, as well as with a screw pitch which is unusually high. The scraping speed will thereby have a reduced value of only 1-10% of the conventional value, but it has been found that in return it is then possible to realize the process in practice. More specifically, it relates to a practically usable compromise between the power of the supplied energy as being sufficient for conveyance and scraping without causing the unwanted heat. It is a surprising result that the low scraping speed and the associated low scraping frequency is sufficient in order to keep the heat exchanger surface free to such an extent that it is possible to operate with a practically acceptable efficiency of the heat exchanger.

It further has to be noticed that it can be advantageous to use a cooling agent with a evaporation temperature that is lower than the approximately −30° C. which for the skilled person will appear as a minimum evaporation temperature in connection with through-flow freezers for ice cream; it has previous been found that at still lower temperatures, a too intense freezing of the ice cream on the heat exchanger will occur. Apparently it is a paradox that with the invention and the associated reduced scraping, it is possible to operate efficiently with freezing temperatures of −40° C. and colder, e.g. down to −100° C., and preferably in the range of −50° C. to 60° C. in order to achieve a good efficiency by freezing down the mass to about −10° C. to −20° C. Use of the conveyor screw in a through-flow freezer shows, however, that exactly this is made possible with the conveyor screw according to the invention.

It has further shown to be advantageous that the pitch of the screw flights is reduced along the longitudinal direction of the conveyor screw to 0.7 to 1, preferably 0.8 to 0.9 at an outlet end of the conveyor screw. Thereby, the pressure increases somewhat towards the outlet end, and the ice cream mass or other mass, which is conveyed by means of the conveyor screw, obtains a suitable pressure at the outlet end for feeding into the following manufacturing machines such as extruding apparatuses. A similar effect may, as mentioned previously, be achieved by increasing the diameter of the core of the conveyor screw but as to manufacture, it is preferred to reduce the pitch of the screw flights instead.

Mainly, in order to achieve a complete scraping of the inner surface of a freezing cylinder by rotation of the conveyor screw, it is advantageous that everywhere along the longitudinal direction of the conveyor screw, at least one screw flight extends to a given highest radius.

If the conveyor screw is made in such a way that the screw flights extending to the highest radial distance from the longitudinal axis progress discontinuously in the longitudinal direction so that a peripherally extending opening exists between these screw flights at least at one position along the longitudinal direction, it has been found that fluctuations in the discharge quantity per time unit may be reduced and actually completely eliminated. The use of openings in screw flights is known from an extruder, which is described in WO 00/44548. It has by the present invention been found to be suitable with from two to eight of such openings in the full length of the conveyor screw, preferably from three to six. Another way to estimate how many openings it is advantageous to provide, is an average distance in the longitudinal direction between the openings of from 1 to 4 times the outer diameter of the screw, preferably form 1.5 to 2.5. The effect of the openings is that the pressure difference between the pressure side and the suction side of the screw flights is equalized which has been found to give a more even pressure distribution in the mass. The high viscosity of the mass results in that the pressure differences in the conveyed mass builds up high local pressure gradients to a greater extent than for masses of low viscosity, as the mass not immediately flows due to the pressure gradient and thereby equalizes it.

Said one or more openings extend in a preferred embodiment of the invention over 120 to 240° of the periphery, preferably over 150 to 210° of the periphery in order to achieve the optimum effect of the openings.

The present invention relates further to an apparatus for making ice cream, comprising a through-flow freezer having an inner surface, which closely encloses a conveyor screw according to the invention as described above, drive means for driving a rotation of the conveyor screw about the longitudinal axis thereof, cooling means for cooling the inner surface, and inlet and outlet to direct an ice cream mass to the inlet end of the conveyor screw and from its outlet end, respectively.

The cooling means are preferably adapted to cool down a through-flowing ice cream mass, which enters with a temperature from −1° C. to −10° C., with from 4 to 25° C.

The method that is made possible by the invention can also be considered as an invention in itself.

BRIEF DESCRIPTION OF THE FIGURES

The invention is illustrated by an example given in the attached drawing in which.

Figure 1:
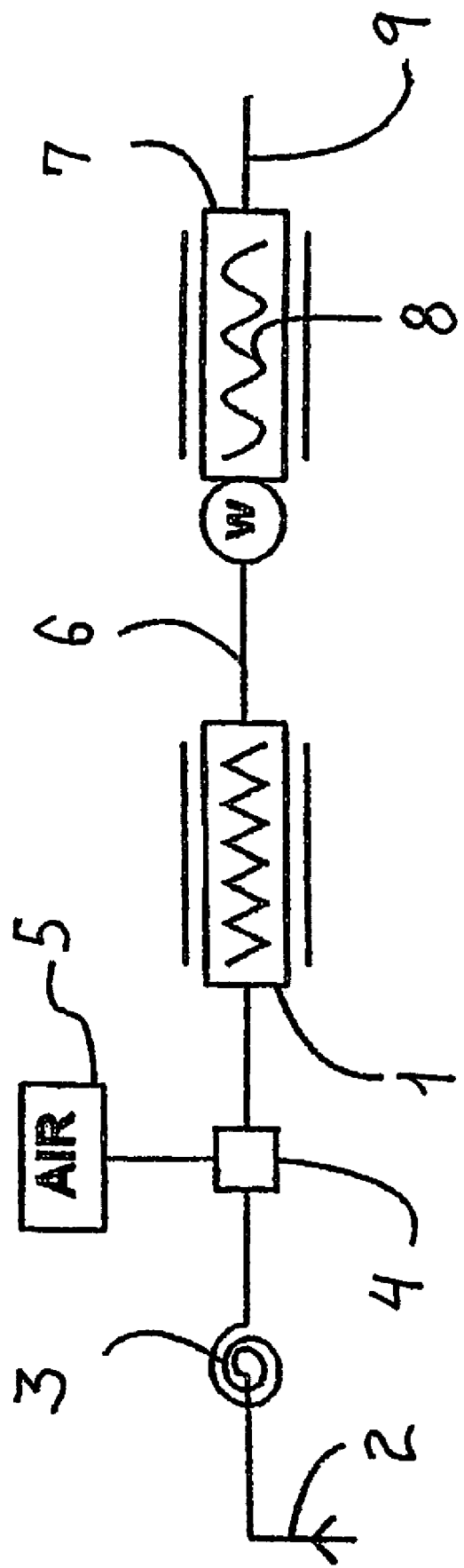
FIG. 1 is a schematic diagram illustrating a plant with an apparatus according to the invention.

All measures in the drawing are indicated in millimetres.

DETAILED DESCRIPTION OF EXAMPLE OF EMBODIMENT OF THE INVENTION

The manufacturing plant for production of extruded ice cream products, as schematically illustrated in FIG. 1, comprises a preceding through-flow freezer 1, which, from a supply 2, is supplied with a "mix" passing a pump 3 and a mixing compartment 4 in which this mix is mixed with air from a compressed air source 5 in order to achieve an overrun of traditionally about 100%. This prepared ice cream substance is cooled down in the through-flow freezer 1 to a temperature below 0° C., such as from −2° C. to −10° C., which is completely normal for later division in portions and forming of the substance.

In connection with the invention, the cooled substance is conveyed further via a pipeline 6 through a subsequent through-flow freezer 7 for later extrusion at a temperature of −12 to −25° C. so that the cut ice bodies can be packed for directly transfer to the freezing storage. The subsequent through-flow freezer 7 is positively conveying, i.e. it comprises a conveyor screw 8 driven by a motor, which is here designated with W (work) to indicate that this driving will result in a certain supply of power to the ice cream mass, partly because of the conveyance function and partly because of the scraping work which has to be performed by the conveyor screw 8 for scraping off of the solid, frozen ice cream mass. The ice cream mass is led via an outlet pipeline 9 to further working such as extrusion.

Figure 2:
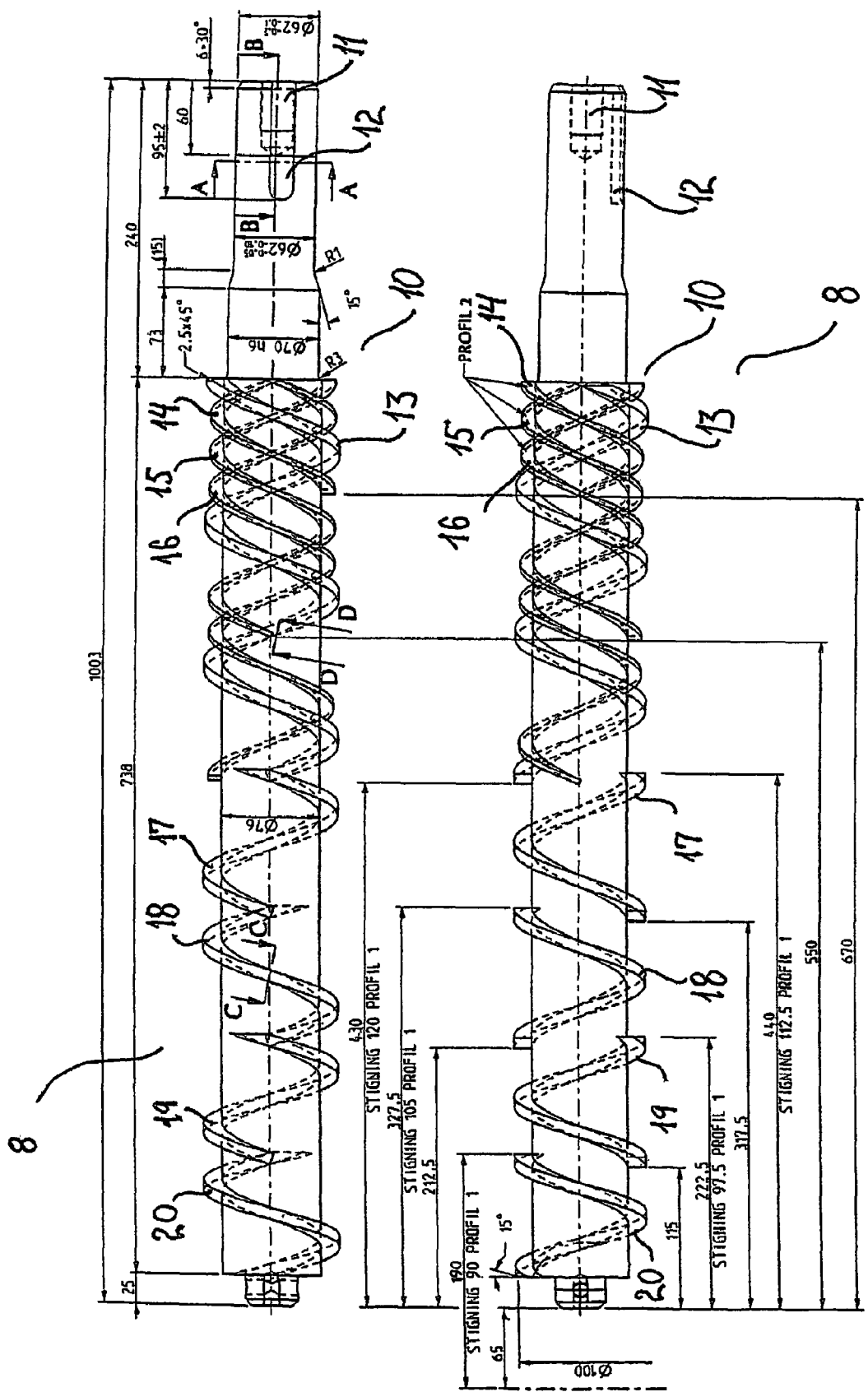
FIG. 2 illustrates, seen form two sides, a conveyor screw according to the invention.
Figure 3:
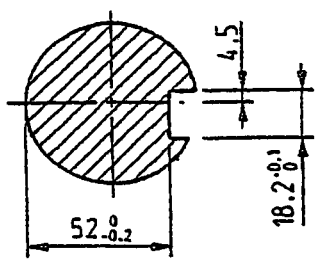
FIG. 3 illustrates a cross section A-A of the conveyor screw illustrated in FIG. 2.
Figure 4:
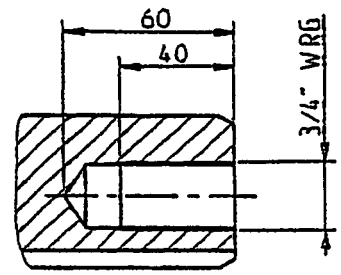
FIG. 4 illustrates a cross section B-B of the conveyor screw illustrated in FIG. 2.

The conveyor screw 8 is illustrated in details in FIG. 2 and comprises at its inlet end 10 a centre hole 11, illustrated in section B-B in FIG. 4 for seating of the conveyor screw 8 and a groove 12, illustrated in section A-A in FIG. 3 for coupling with the motor W. One scraping screw flight 13 progresses from the inlet end with an outer diameter of 105 millimetres and parallel to this progress from the inlet end 10 three further assisting screw flights 14, 15, 16 with an outer diameter of 97,8 millimetres so that they do not reach the wall of the freezing cylinder in the subsequent through-flow freezer 7.

The distance in the longitudinal direction of the conveyor screw 8 between the beginning of the screw flights 13, 14, 15, 16 and the end of the last screw flight 20 is 738 millimetres. The first assisting screw flight 14 ends 68 millimetres in the longitudinal direction from its beginning, the second assisting screw flight 15 ends 188 millimetres in the longitudinal direction from its beginning while the third assisting screw flight 16 ends 298 millimetres in the longitudinal direction from its beginning. The scraping screw flight 13 is likewise interrupted 298 millimetres in the longitudinal direction of its beginning and is succeeded by a second scraping screw flight 17 which starts at a 10 millimetres shorter distance from the inlet end 10 than at the position where the first scraping screw flight 13 ends but with a displacement of half a turn so that a peripherally progressing opening occurs that extends over 180°. The two scraping screw flights 13, 17 overlap in this way each other in the longitudinal direction, and all of the wall of the freezing cylinder in the subsequent through-flow freezer 7 is thereby scraped by a screw flight 13, 17.

Figure 5:
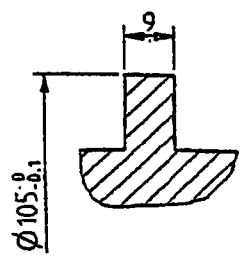
FIG. 5 illustrates a section of a cross section C-C of the conveyor screw illustrated in FIG. 2.
Figure 6:
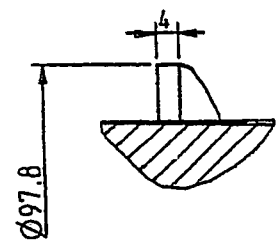
FIG. 6 illustrates a sectional view of a cross section D-D of the conveyor screw illustrated in FIG. 2.
Figure 7:
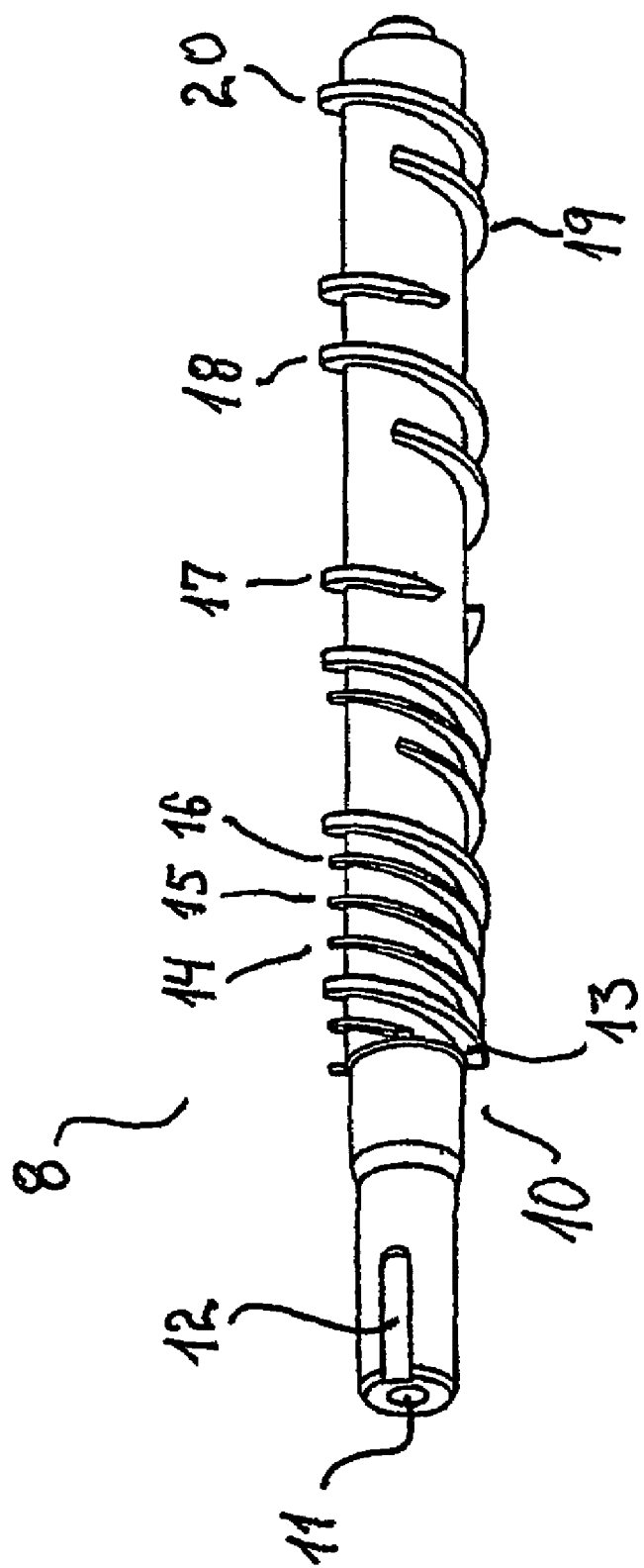
FIG. 7 illustrates a view in perspective of the conveyor screw illustrated in FIG. 2.

The pitch of the first screw flights 13, 14, 15, 16 is 120 millimetres, i.e. that a turn extends over 120 millimetres in the longitudinal direction. The non-dimensional pitch is 1.14 as the outer diameter of the conveyor screw 8 is 105 millimetres. The second scraping screw flight has a lower pitch, namely 112.5 millimetres or 1.07, and progresses over 122.5 millimetres where after it is succeeded by a third, a fourth and a fifth scraping screw flight 18, 19, 20 with decreasing pitches of 1, 0.93 and 0.86, respectively where each screw flight 18, 19, 20 overlaps the previous one by 10 millimetres but likewise is rotated half a turn in proportion to this. A cross-section C-C of a scraping screw flight 18 is illustrated in FIG. 5 and the end of the assisting screw flight 15 is illustrated in FIG. 6. Finally, the complete conveyor screw 8 is illustrated in a perspective view in FIG. 7.

The ends of the screw flights 13-20 should be carefully rounded in order to prevent creation of large pressure gradients near the endings which otherwise can result in the air being locally pulled out of the ice cream mass with a smaller degree of swelling and larger air pockets as a consequence. The scraping screw flights 13, 17, 18, 19, 20 can optionally on the pressure side, i.e. the side which is in front and scrapes the inner surface of the freezing cylinder, be provided with a scraping projection in order to ease the scraping of ice from the surface. A large number of designs of scraping projections is known from the literature.

The invention claimed is:

1. A conveyor screw having a plurality of screw flights, each of which extends in a helical path about a longitudinal axis, wherein at least two of the screw flights extend in parallel from an inlet end part of the conveyor screw to an outlet end part of the conveyor screw, wherein outer edges of the at least two of the screw flights extend a different radial distance from the longitudinal axis, wherein at least a radially shorter of the screw flights is continuous along the full length thereof, and wherein the radially shorter of the screw flights extend in the range of 0.85 to 0.98 times the radius of the radially longer of the screw flights.

2. A conveyor screw according to claim 1, wherein the radially shorter of the screw flights extends from substantially the same longitudinal position of the inlet end part of the conveyor screw as the radially longer of the screw flights.

3. A conveyor screw according to claim 1, wherein the radially shorter of the screw flights extends from the inlet end part and along the conveyor screw for between 5% and 65% of the total length thereof.

4. A conveyor screw according to claim 1, wherein at least two of the radially shorter of the screw flights extend from the inlet end part and for different longitudinal distances from the inlet end part.

5. A conveyor screw according to claim 4, wherein the difference in the longitudinal distances from the inlet end part of said screw flights amounts to from 8% to 50% of the total length of the conveyor screw.

6. A conveyor screw according to claim 1, wherein the pitch of the screw flights at the inlet end of the conveyor screw is 0.9 to 1.4.

7. A conveyor screw according to claim 1, wherein the pitch of the screw flights is reduced along the longitudinal direction of the conveyor screw to 0.7 to 1 at an outlet end of the conveyor screw.

8. A conveyor screw according to claim 1, wherein everywhere along the longitudinal direction of the conveyor screw, at least one screw flight extends to a given highest radius, so that the complete inner wall of a cylindrical cavity in which the conveyor screw is placed, is scraped by rotation of the conveyor screw.

9. A conveyor screw according to claim 1, wherein the screw flights extending to highest radial distance from the longitudinal axis progress discontinuously in the longitudinal direction, so that a peripherally extending opening exists between these screw flights at least at one position along the longitudinal direction.

10. A conveyor screw according to claim 9, wherein said opening or openings extend over 120 to 240° of the periphery 11. A conveyor comprising a stationary part having an inner surface, which closely encloses a conveyor screw having a plurality of screw flights, each of which extends in a helical path about a longitudinal axis, wherein at least two of the screw flights extend in parallel from an inlet end part of the conveyor screw and are continuous along the full length thereof, wherein outer edges of the at least two of the screw flights extend a different radial distance from the longitudinal axis and wherein the radially shorter of the screw flights extends in a range of 0.85 to 0.98 times the radius of the longer screw flight, drive means for rotating the conveyor screw about the longitudinal axis thereof, and inlet and outlet to direct a mass to the inlet end of the conveyor screw and from its outlet end, respectively.

12. An apparatus for making ice cream, comprising a through-flow freezer having an inner surface, which closely encloses a conveyor screw having a plurality of screw flights, each of which extends in a helical path about a longitudinal axis wherein at least two of the screw flights in parallel from an inlet end part of the conveyor screw, wherein outer edges of the at least two of the screw flights extend a different radial distance from the longitudinal axis, and wherein a radially shorter of the screw flights extends in a range of 0.85 to 0.98 times the radius of the radially longer screw flight and is continuous along the full length thereof, drive means for rotating the conveyor screw about the longitudinal axis thereof, cooling means for cooling the inner surface, an inlet for directing an ice cream mass to the inlet end part of the conveyor screw and an and outlet for receiving the ice cream mass from an outlet end of the conveyor screw, and wherein the cooling means are adapted to cool down a through-flowing ice cream mass, which enters at a temperature of 4° C. to 25° C., to a temperature of 0° C.

13. An apparatus according to claim 12, wherein the drive means is adapted to drive the conveyor screw with from 10 to 50 rotations per minute, preferably with from 20 to 35 rotations per minute.

14. Method of making an ice cream mass, wherein, after an ice cream mass is fed into the inlet of an apparatus comprising a through-flow freezer having an inner surface, which closely encloses a conveyor screw, having a plurality of parallel screw flights, each of which extends in a helical path about a longitudinal axis, wherein at least two of the screw flights extend from an inlet end part of he conveyor screw, wherein outer edges of the at least two of the screw flights extend a different radial distance from the longitudinal axis, and wherein a radially shorter of the screw flights extend in a range of 0.85 to 0.98 times the radius of the radially longer screw flight, drive means for rotating the conveyor screw about the longitudinal axis thereof, cooling means for cooling the inner surface, an inlet for directing an ice cream mass to the inlet end part of the conveyor and an outlet for receiving the ice cream mass from an outlet end of the conveyor screw, wherein an ice cream mass is fed into the inlet of the apparatus, wherein the ice cream mass is cooled down by said cooling means from an entering temperature of 4° C. to 25° C. to a temperature below 0° C. as it is conveyed by the conveyor screw from the inlet end part of the conveyor screw to the outlet of the apparatus, and wherein the radially shorter screw flight assists with the conveyance of a part of the ice cream mass without affecting an ice layer created on the inner surface of the through-flow freezer.

15. An apparatus according to claim 12, wherein the radially shorter of the screw flights extends from the inlet end part from substantially the same longitudinal position of the conveyor screw as the radially longer screw flight.

16. An apparatus according to claim 12, wherein the radially shorter of the screw flights extends from the inlet end part and along the conveyor screw for between 5% and 65% of the total length thereof.

17. An apparatus according to claim 12, wherein at least two of the radially shorter of the screw flights extend from the inlet end part and for different longitudinal distances from the inlet end part.

18. An apparatus according to claim 17, wherein the difference in the longitudinal distances from the inlet end part of said screw flights amounts to from 8% to 50% of the total length of the conveyor screw.

19. An apparatus according to claim 12, wherein the pitch of the screw flights at the inlet end of the conveyor screw is 0.9 to 1.4.

20. An apparatus according to claim 12, wherein the pitch of the screw flights is reduced along the longitudinal direction of the conveyor screw to 0.7 to 1 at an outlet end of the conveyor screw.

21. An apparatus according to claim 12, wherein everywhere along the longitudinal direction of the conveyor screw, at least one screw flight extends to a given highest radius, so that the complete inner wall of a cylindrical cavity in which the conveyor screw is placed, is scraped by rotation of the conveyor screw.

22. An apparatus according to claim 1, wherein the screw flights extending the highest radial distance from the longitudinal axis progress discontinuously in the longitudinal direction, so that a peripherally extending opening exists between these screw flights at least at one position along the longitudinal direction.

23. An apparatus according to claim 22, wherein said opening or openings extend over 120 to 240° of the periphery.

\* \* \* \* \*